(12) United States Patent
Hulstein et al.

(10) Patent No.: US 9,253,944 B2
(45) Date of Patent: Feb. 9, 2016

(54) SNOUT HEIGHT AND TENSION ADJUSTMENT

(71) Applicants: Nathan D. Hulstein, Litchfield, MN (US); Allan M. Cronen, Willmar, MN (US); Michael L. Banken, Litchfield, MN (US)

(72) Inventors: Nathan D. Hulstein, Litchfield, MN (US); Allan M. Cronen, Willmar, MN (US); Michael L. Banken, Litchfield, MN (US)

(73) Assignee: Dragotec USA, Inc., Fenton, IA (US)

(*) Notice: Subject to any disclaimer, the term of this patent is extended or adjusted under 35 U.S.C. 154(b) by 0 days.

(21) Appl. No.: 14/077,801

(22) Filed: Nov. 12, 2013

(65) Prior Publication Data

US 2014/0130474 A1    May 15, 2014

Related U.S. Application Data

(60) Provisional application No. 61/725,452, filed on Nov. 12, 2012.

(51) Int. Cl.
*A01D 23/02*    (2006.01)
*A01D 41/06*    (2006.01)
*A01D 45/02*    (2006.01)

(52) U.S. Cl.
CPC .............. *A01D 41/06* (2013.01); *A01D 45/021* (2013.01)

(58) Field of Classification Search
CPC . A10D 45/021; A10D 45/023; A10D 45/025; A10D 41/142; B25B 29/02
USPC ............................................................ 56/119
See application file for complete search history.

(56) References Cited

U.S. PATENT DOCUMENTS

| | | | | | |
|---|---|---|---|---|---|
| 2,845,992 | A | * | 8/1958 | Cramer | 297/303.5 |
| 4,446,682 | A | * | 5/1984 | Jennen et al. | 56/119 |
| 4,553,379 | A | * | 11/1985 | Kalverkamp | 56/60 |
| 4,569,506 | A | * | 2/1986 | Vassalotti | 254/29 A |
| 5,195,309 | A | * | 3/1993 | Mossman | 56/119 |
| 5,787,697 | A | * | 8/1998 | Post | 56/119 |
| 5,865,019 | A | * | 2/1999 | Hurlburt et al. | 56/119 |
| 5,910,092 | A | * | 6/1999 | Bennett | 56/119 |
| 6,247,297 | B1 | * | 6/2001 | Becker | 56/119 |
| 6,513,313 | B1 | * | 2/2003 | Bennett | 56/319 |
| 7,240,471 | B2 | * | 7/2007 | Mossman | 56/119 |
| 7,350,345 | B2 | * | 4/2008 | Slabbinck et al. | 56/119 |
| 8,141,331 | B2 | * | 3/2012 | Bich et al. | 56/15.2 |
| 8,640,434 | B2 | * | 2/2014 | Lohrentz et al. | 56/119 |
| 2007/0193242 | A1 | * | 8/2007 | Kost et al. | 56/119 |
| 2009/0025354 | A1 | * | 1/2009 | Guldenpfennig et al. | 56/119 |
| 2012/0291410 | A1 | * | 11/2012 | Silver et al. | 56/119 |

* cited by examiner

*Primary Examiner* — Árpád Fábián-Kovács
(74) *Attorney, Agent, or Firm* — Merchant & Gould P.C.

(57) ABSTRACT

Adjustment of snout height and tension is provided for a combine harvester. The combine harvester includes a header having a plurality of row unit divider assemblies. The row unit divider assemblies include a bonnet portion, a snout portion, and a height and tension adjustment device. The height and tension adjustment device is coupled between the bonnet portion and the snout portion and is operable to adjust an angle and tension of the snout portion with respect to the bonnet portion.

14 Claims, 5 Drawing Sheets

SNOUT HEIGHT AND TENSION ADJUSTMENT

CROSS-REFERENCE TO RELATED APPLICATION

This application claims priority to U.S. Application No. 61/725,452, titled SNOUT HEIGHT AND TENSION ADJUSTMENT, filed on Nov. 12, 2012, the disclosure of which is hereby incorporated by reference in its entirety.

BACKGROUND

Harvesting of agricultural crops is often performed using a combine harvester. The combine harvester typically includes a tractor and a header. The header extends out from the front of the tractor and operates to harvest the crops as it is advanced by the tractor through an agricultural field.

SUMMARY

In general terms, the present disclosure relates to a combine harvester, and also relates to height and tension adjustment of a snout of a combine harvester.

One aspect is a row unit divider assembly for a combine harvester, the row unit divider assembly comprising: a bonnet portion; a snout portion pivotally connected to the bonnet portion; and a height and tension adjustment device coupled between the bonnet portion and the snout portion and operable to adjust an angle of the snout portion with respect to the bonnet portion and a tension applied to the snout portion.

Another aspect is a combine harvester including a row unit divider assembly for a combine harvester, the row unit divider assembly comprising: a bonnet portion; a snout portion pivotally connected to the bonnet portion; and a height and tension adjustment device coupled between the bonnet portion and the snout portion and operable to adjust an angle of the snout portion with respect to the bonnet portion and a tension applied to the snout portion.

Yet another aspect is a height and tension adjustment device configured for installation between a bonnet portion of a row unit divider assembly and a snout portion of the row unit divider assembly, the height and tension adjustment device comprising: a rod including a first end and a second end, wherein the first end is configured to be coupled to the bonnet portion of the row unit divider assembly; a height adjustment device positioned toward the second end of the rod and being adjustable along the length of the rod to adjust an angle of the snout portion with respect to the bonnet portion; and a tension adjustment device positioned between the first end of the rod and the height adjustment knob, the tension adjustment knob adjustable along the length of the rod to adjust a force applied to the snout.

A further aspect is a method of adjusting a snout of a row unit divider assembly for a combine harvester, the method comprising: installing a height and tension adjustment device between a bonnet and snout of the row unit divider assembly; adjusting a height of the snout with respect to the ground by adjusting a height adjustment knob of the height and tension adjustment assembly; adjusting a downward force applied to the snout by adjusting a tension adjustment knob of the height and tension adjustment assembly; and resisting upward movement of the snout with respect to the bonnet after adjusting the height and downward force, while permitting upward movement if the upward movement has a sufficient force that exceeds the downward force.

DETAILED DESCRIPTION

Figure 1:
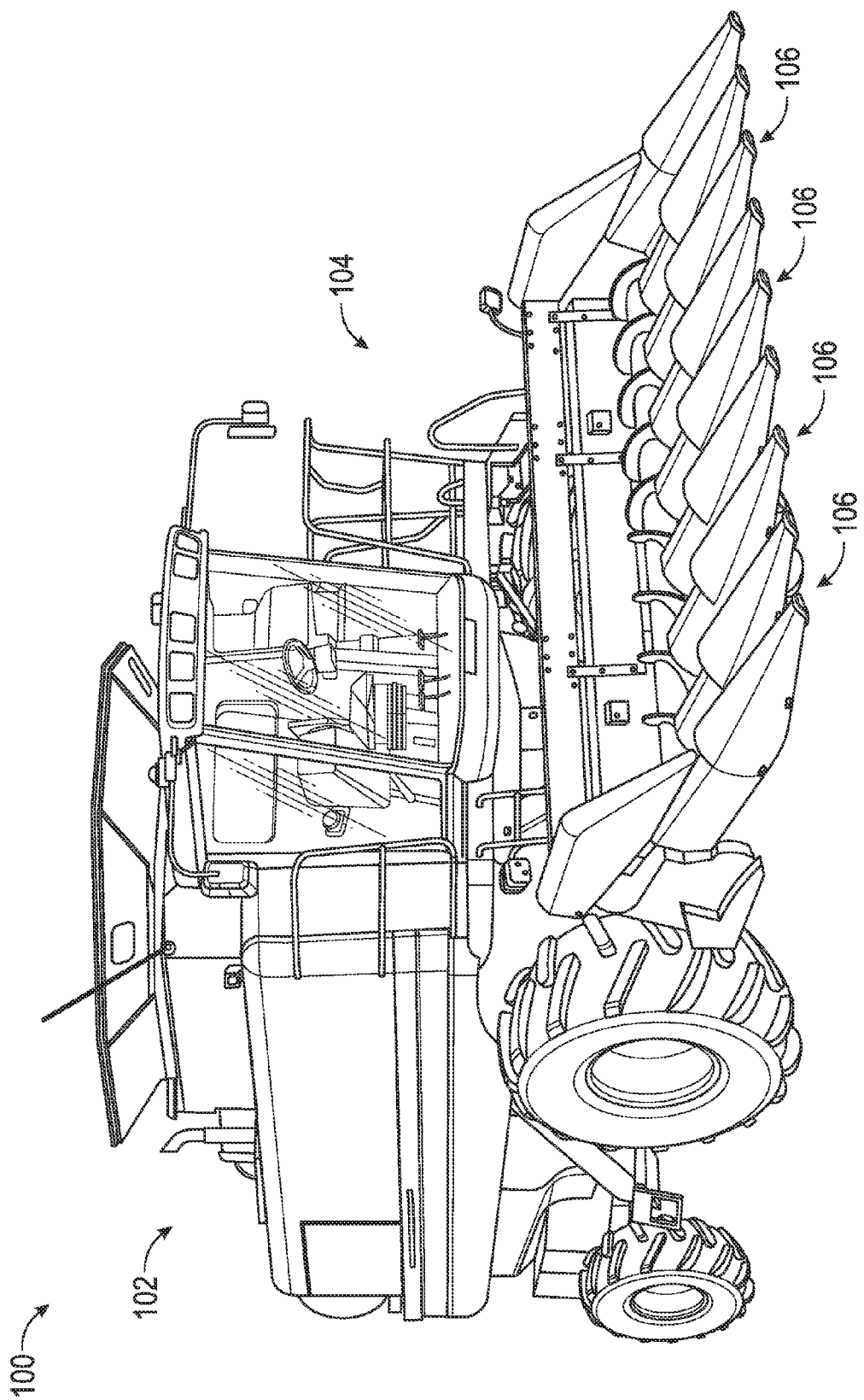
FIG. 1 is a perspective front view of an example combine harvester according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 3:
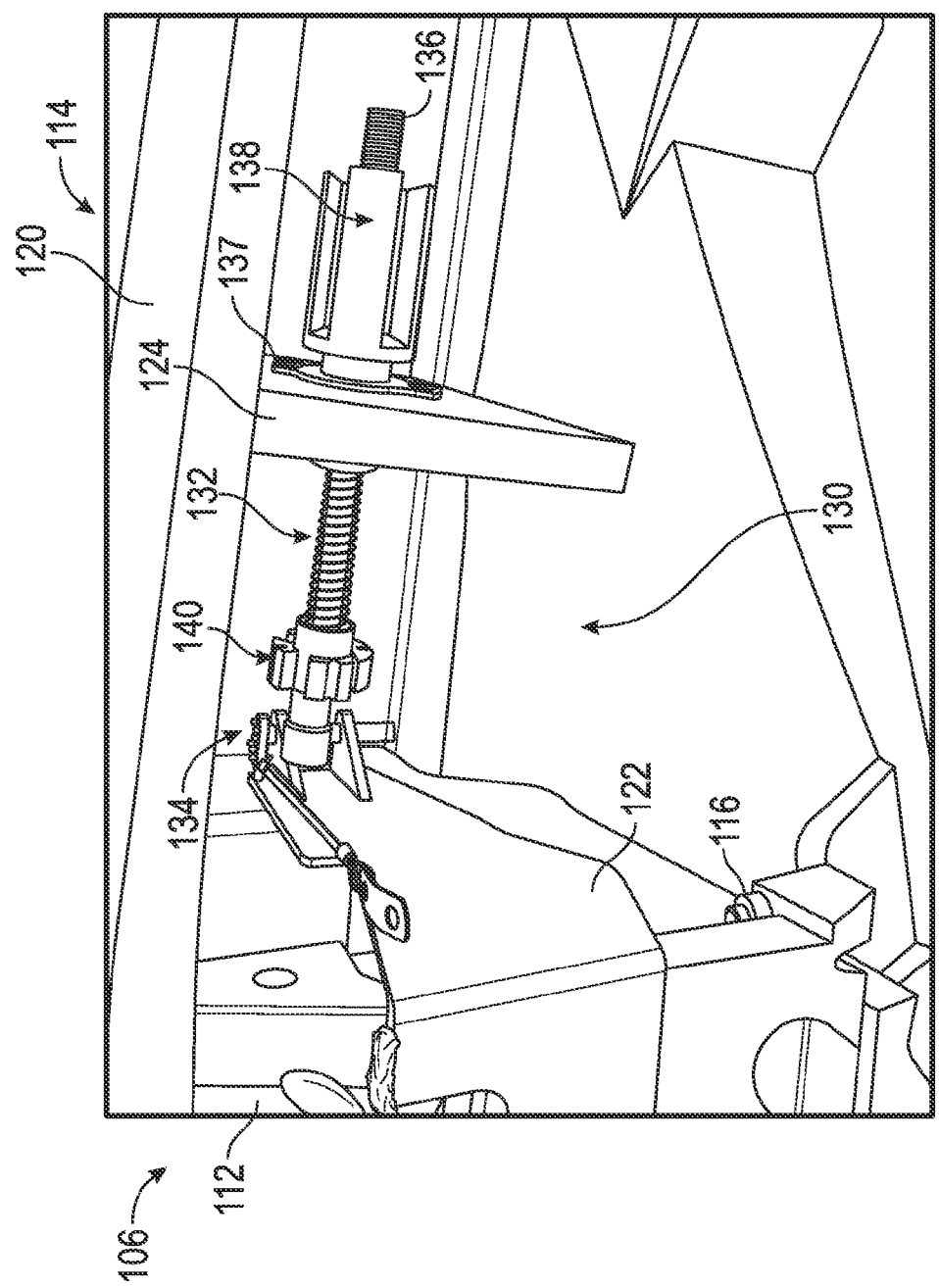
FIG. 3 is a perspective bottom view of a portion of the row unit divider assembly shown in FIG. 2, further including a height and tension adjustment device.
Figure 4:
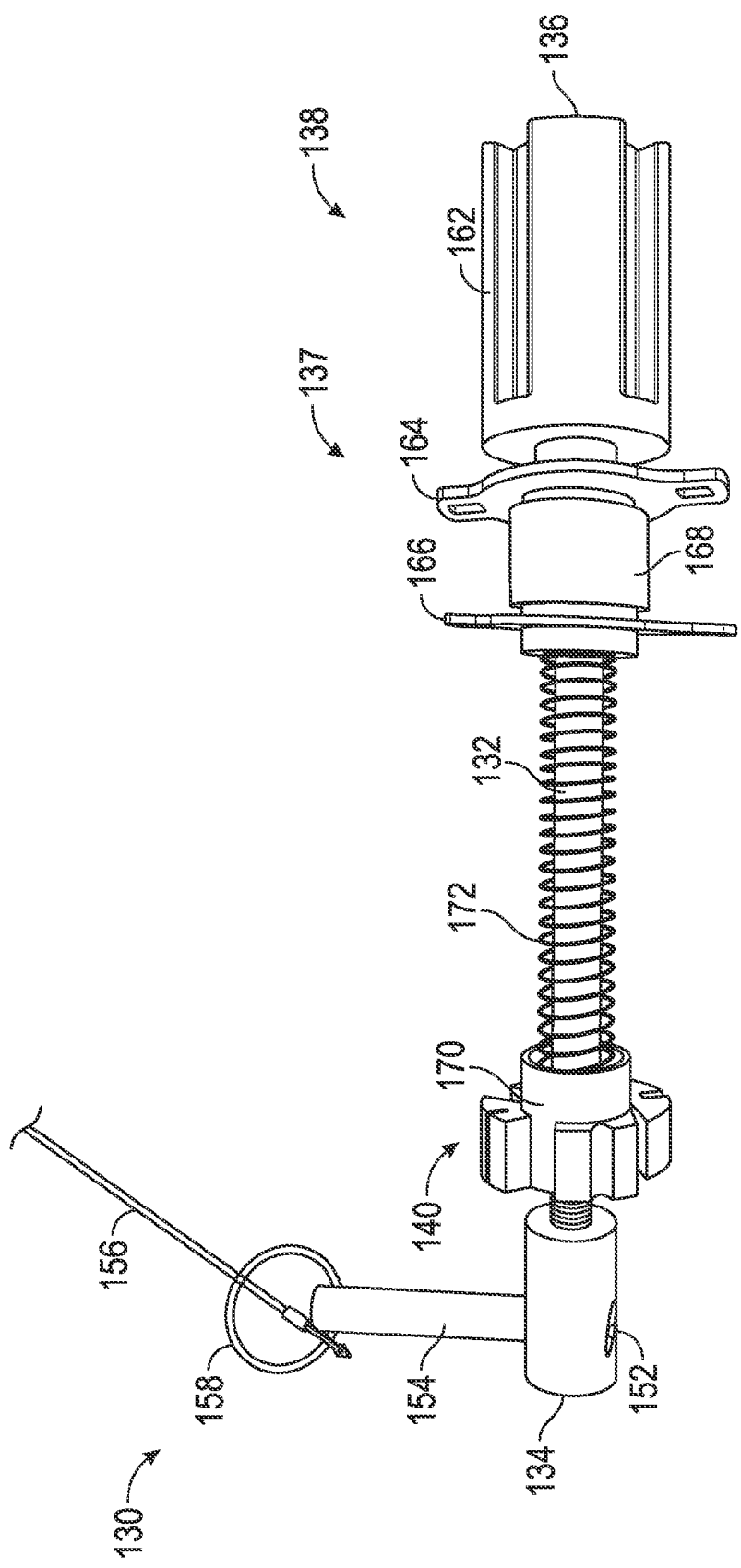
FIG. 4 is a side view of the example height and tension adjustment device shown in FIG. 3.

FIG. 1 is a perspective view of an example combine harvester 100. In this example, the combine harvester 100 includes a combine machine 102 and header 104. The header 104 includes multiple row unit divider assemblies 106, including a height and tension adjustment device 130 (as shown in FIGS. 3-4).

In this example, the combine harvester 100 operates to harvest grain crops. In some embodiments, the harvester is a corn harvester, which operates to harvest corn, for example. In some embodiments, the harvester is a combine, which performs harvesting operations including reaping, threshing, and winnowing.

The combine harvester 100 includes a combine machine 102. The harvester machine 102 is typically a self-propelled vehicle, including wheels and an engine that drives the wheels. The combine harvester 100 also typically includes a cab where an operator interacts with various controls to operate and control the harvester 100.

The header 104 is arranged at and extends from a forward end of the harvester. As the combine harvester 100 advances forward through the crops, the header 104 operates to collect and cut crops to separate them from the ground.

The separated crops are then fed into the combine machine 102 where the corn is separated from the cob and material other than grain (M.O.G.), which is dropped from the rear of the combine machine 102. In some embodiments, a threshing and winnowing process is used to loosen and separate the grain from the chaff that remains. The grain is then stored in a storage bin within the combine machine 102, and can be subsequently transferred to another vehicle or storage area, as desired.

In some embodiments, the header 104 includes a plurality of row unit divider assemblies 106. The row unit divider assemblies 106 are sized and configured to gather crops from respective rows of the crops. For example, corn is often grown along rows, which are separate from each other with a uniform row spacing. Row spacing can be from about 15 inches to about 38 inches, for example. The row unit divider assemblies 106 are spaced from each other at about the same spacing.

When the combine harvester 100 is operating, the row unit divider assemblies 106 are positioned between the rows. As the row unit divider assemblies 106 are advanced through the crop by the combine harvester, the row unit divider assemblies 106 guide and support the plants as they enter the combine machine 102.

Figure 2:
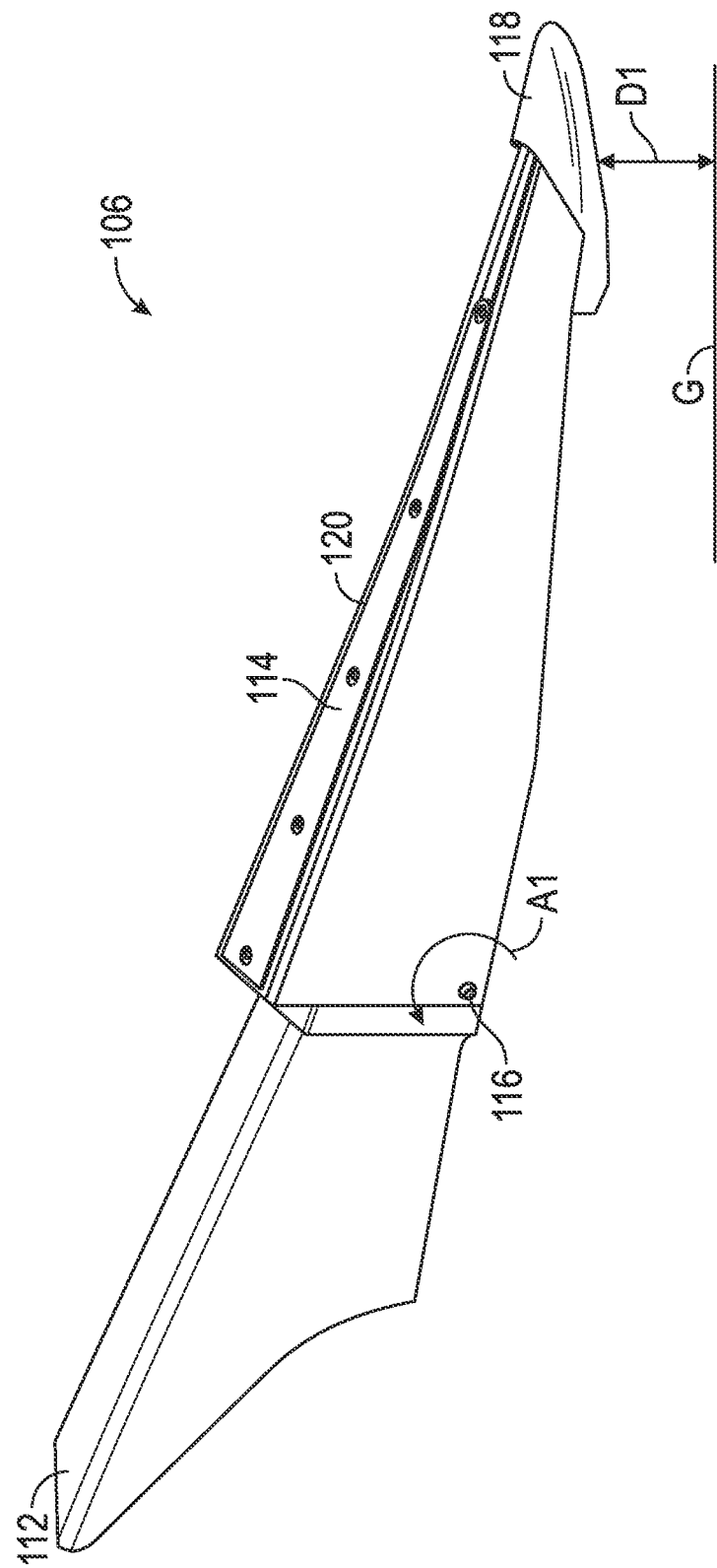
FIG. 2 is a perspective side view of an example row unit divider assembly of the example combine harvester shown in FIG. 1.

FIG. 2 is a side perspective view of an example of a row unit divider assembly 106. In this example, the row unit divider assembly 106 includes a bonnet 112 and a snout 114. Also illustrated in FIG. 2 is a snout pivot 116, wear point 118, and snout body 120.

The bonnet 112 is the rearward portion of the row unit divider assembly 106 that is fastenable to a forward end of the combine machine 102. The bonnet 112 includes a bonnet frame (shown in FIG. 3) that provides structural support to the bonnet 112 for connection with the combine machine 102.

The snout 114 is an elongate structure that is pivotally connected to and extends from a forward end of the bonnet 112. The snout includes a body 120, which is formed of a sturdy material such as metal or plastic. In some embodiments, the body 120 is formed of polyethylene, for example. In some embodiments the body is an elongate structure having a tapered shape that is larger toward the rearward end and smaller toward the forward end.

Figure 5:
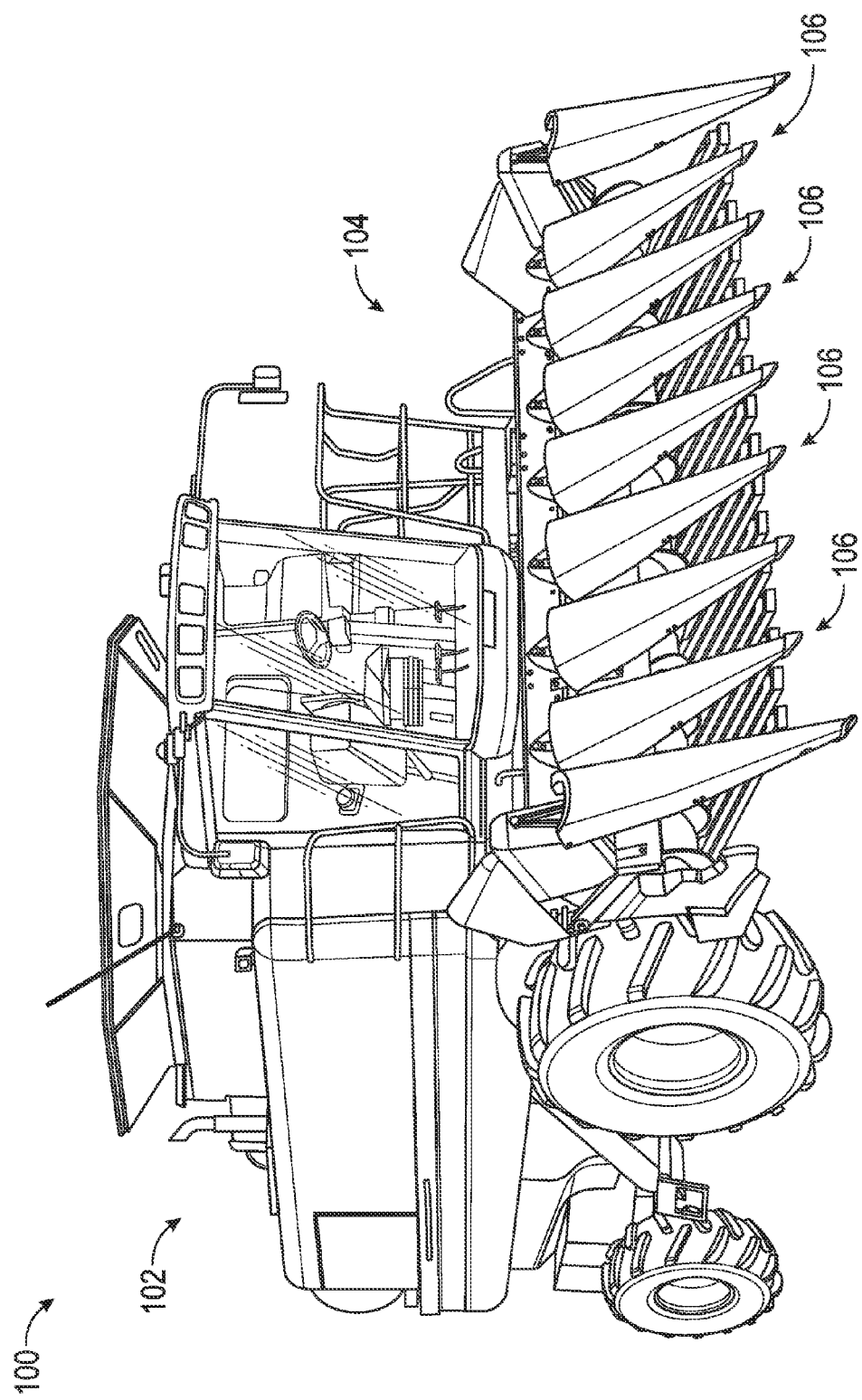
FIG. 5 is a perspective view of the example combine harvester shown in FIG. 1, and further illustrating a folded configuration of the row unit divider assemblies.

In some embodiments, the snout 114 is connected to the bonnet 112 at a snout pivot 116. The snout pivot 116 permits the snout to pivot with respect to the bonnet 112 around the snout pivot 116, such as in the direction A1, as well as in the direction opposite direction A1. The pivot 116 permits the height (D1) of the snout 114 to be adjusted with respect to the ground G, without adjusting the position of the bonnet 112. The pivot 116 also permits the snout 114 to pivot when the snout (or wear point 118) comes in contact with the ground G or another object, such as to reduce the chance of breaking the snout 114 or row unit divider assembly 106. Further, the pivot 116 permits the row unit divider assemblies 106 to be placed in a folded configuration (such as shown in FIG. 5) for more compact transportation and storage.

When the snout 114 pivots about bonnet 112, an angle between the snout 114 and the bonnet 112 changes. When the position of the bonnet 112 is held stationary, a change in the angle causes a change in the height (D1) of the snout with respect to the ground. Therefore, by adjusting the angle between the snout 114 and the bonnet 112, the height (D1) of the snout 114 is also adjusted.

FIG. 3 is a perspective bottom view of a portion of the row unit divider assembly 106, shown in FIG. 2. In this example, the row unit divider assembly 106 includes the bonnet 112, snout 114, snout pivot 116, and height and tension adjustment device 130. The bonnet 112 includes a bonnet frame 122. The snout 114 includes a body 120 including a bridge 124.

The height and tension adjustment device 130 permits easy adjustment of the height (D1) of the snout with respect to the ground, and the tension by which the snout 114 is pressed toward the ground.

In this example, the height and tension adjustment device 130 includes a rod having a first end 134, a second end 136, a bridge coupler 137, a height adjustment device 138, and a tension adjustment device 140.

The rod 132 is a rigid elongate member, such as made of metal. A first end 134 of the rod 132 is configured to be connected to the bonnet frame 122. In some embodiments, the first end 134 includes a rod end, formed of a cylindrical tube and having an aperture extending therethrough. The first end 134 is connected to the bonnet frame 122 using a pin, for example. The pin forms a pivot axis to permit the rod 132 to pivot with respect to the bonnet frame 122 when the angle changes between the bonnet 112 and the snout 114. The pin also permits the height and tension adjustment device 130 to be quickly disconnected from the bonnet frame 122 by removing the pin from the first end 134, allowing the snout 114 to freely pivot about the snout pivot 116.

A second end 136 of the rod 132 is arranged opposite the first end 134. In some embodiments, the rod 132 extends through a bridge of the snout 114, and is fastened to the bridge 124 with a bridge coupler 137.

The bridge 124 is a portion of the snout 114 to which the height and tension adjustment device 130 can be fastened. In some embodiments, the bridge 124 is a structural feature integrally molded into the snout body 120. The snout body 120 and the bridge 124 can be formed of polyethylene, for example, or other suitable materials.

The height adjustment device 138 is arranged toward the second end 136 of the rod and operates to adjust the angle between the bonnet 112 and snout 114, and accordingly to adjust a height of the snout 114 with respect to the ground. In the illustrated example, the height adjustment device 138 includes a height adjustment knob having threaded features that engage with a corresponding threaded feature of the rod 132. By rotating the knob clockwise or counter clockwise, the rod 132 is advanced through bridge 124, adjusting the distance between the first end 134 and the bridge 124, and therefore causing the snout 114 to pivot about the snout pivot 116.

The tension adjustment device 140 is positioned between the first end 134 and the second end 136 of the rod 132, and between the first end 134 and the height adjustment device 138. For example, in some embodiments the height adjustment device 138 and the tension adjustment device 140 are configured to be arranged on opposite sides of the bridge 124.

The tension adjustment device 140 is configured to provide a downward force on the snout 114 to oppose upward movement of the snout 114, and to provide an adjustable magnitude of the downward force. In this example, the tension adjustment device 140 includes a tension adjustment knob having threaded features that engage with corresponding threaded features on the rod 132. Rotation of the knob clockwise and counter clockwise permits the tension to be adjusted to increase or decrease the tension supplied by the tension adjustment device 140.

As a more specific example, the tension adjustment device 140 includes a tension adjustment knob and a spring. The tension adjustment knob is rotatable to increase or decrease the amount that the spring is compressed. The greater the compression, the greater the force that the spring applies between the tension adjustment knob and the bridge 124. When the snout 114 moves upward (pivoting in the direction A1, shown in FIG. 2) the bridge moves toward the tension adjustment knob, thereby further compressing the spring. Accordingly, the spring resists this movement, and tends to keep the snout 114 down unless the snout comes into contact with an object that provides a force sufficient to overcome the force of the spring, in which case the snout 114 is permitted to rise up. Once the upward force has been removed, the snout 114 returns to the original position, as set by the height adjustment device 138.

In some embodiments, the height and tension adjustment device 130 permits hand adjustment of the height and tension of the snout without the need for any additional tools.

In some embodiments, the height and tension adjustment device 130 permits full range of motion of the snout 114 with respect to the bonnet 112 (and the ground).

FIG. 4 is a side view of the example height and tension adjustment device 130 shown in FIG. 3. In this example, the height and tension adjustment device 130 includes the rod having the first end 134, the second end 136, bridge coupler 137, the height adjustment device 138, and the tension adjustment device 140.

The rod 132 is typically an elongate cylindrical rod, which is at least partially threaded for interaction with the height adjustment device 138 and the tension adjustment device 140.

Adjacent the first end 134 of the rod is an aperture 152. A pin 154 is provided which is sized to be inserted within the aperture 152 and has a length suitable for pivotally coupling the first end 134 with the bonnet frame 122 (as shown in FIG. 3). To prevent loss of the pin 154, a cord 156 is provided in some embodiments, which is connected to the pin 154 by a ring, for example. An opposite end of the cord 156 can be fastened to a part of the row unit divider assembly 106, such as to the bonnet frame 122 (as also shown in FIG. 3).

The height adjustment device 138 is arranged toward the second end of the rod 132. In this example, the height adjustment device 138 includes a height adjustment knob 162. The height adjustment knob 162 includes a threaded internal bore that engages with a threaded portion of the rod 132. The position of the height adjustment knob 162 is adjusted by a user by rotating the height adjustment knob clockwise or counter clockwise. When the height adjustment knob 162 is moved away from the first end 134, the snout 114 pivots (in the direction opposite direction A1, shown in FIG. 2), which causes the snout 114 to be lowered closer to the ground (reducing distance D1, shown in FIG. 2). When the height adjustment knob 162 is moved toward the first end 134, the snout 114 pivots (in the direction A1, shown in FIG. 2), which causes the snout 114 to be raised away from the ground (increasing distance D1, shown in FIG. 2.)

The height adjustment knob 162 is configured to be adjusted by a hand of an operator, without requiring additional tools. In this example, the knob 162 includes relatively large protrusions sized for easy insertion of one or more fingers therein, and the knob 162 is sized to be grasped in the hand of the operator.

The bridge coupler 137 is configured to connect the height and tension adjustment device 130 to the bridge 124 (shown in FIG. 3) of the snout 114. In this example, the bridge coupler 137 includes plates 164 and 166, and slide bushing 168. When installed on the snout 114, the slide bushing 168 is inserted within an aperture formed in the bridge 124 and functions to reduce sliding friction between the rod 132 and the bridge 124 to permit sliding movement of the rod 132 through the aperture in the bridge 124. The plates 164 and 166 are sized larger than the bridge aperture and are configured to securely fasten the height and tension adjustment device 130 to the bridge 124. For example, the plate 164 is positioned forward the aperture and the plate 166 is positioned rearward the aperture. Bolts or other fasteners can be used to couple the plates together through additional apertures formed through the bridge 124 and secure the plates on either side of the bridge 124. The bridge coupler 137 secures the height and tension adjustment device 130 to the bridge 124, while permitting the rod 132 to slide back and forth through the bridge 124.

The tension adjustment device 140 is positioned between the first end 134 of the rod 132 and the bridge coupler 137, and operates to provide an adjustable force between the bonnet 112 and the snout 114 to resist movement of the snout 114 in the direction A1 shown in FIG. 2, tending to lift the snout 114 away from the ground.

In this example, the tension adjustment device 140 includes a tension adjustment knob 170 and a spring 172.

The tension adjustment knob 170 includes a threaded bore that is configured to engage with a threaded portion of the rod 132. Rotation of the tension adjustment knob 170 causes the knob 170 to move forward and backward along the rod 132, thereby increasing or decreasing the compression of the spring 172.

The spring 172 surrounds a portion of the rod 132 and is coaxial (or substantially coaxial) with the rod 132. In this example, the spring 172 is a helical compression spring. When compressed, the spring 172 generates a force that is applied to the tension adjustment knob 170 at one end, and to the bridge (either directly or through the bridge coupler 137) at an opposite end.

When the tension adjustment knob 170 is rotated, the amount of force required to lift the snout 114 away from the ground (to increase distance D1, shown in FIG. 2) is adjusted. When the knob 170 is moved toward the bridge coupler 137, the force is increased, and when the knob 170 is moved away from the bridge coupler 137, the force is decreased.

The tension adjustment knob 170 is configured to be adjusted by a hand of an operator, without requiring additional tools. In this example, the knob 170 includes relatively large protrusions sized for easy insertion of one or more fingers therebetween, and the knob 162 is sized to be grasped in the hand of the operator.

When the snout 114 is raised away from the ground, the snout 114 pivots about the snout pivot 116 in the direction A1, shown in FIG. 3. This causes the bridge 124 and bridge coupler 137 to move toward the first end 134 of rod 132, and causes rod 132 to slide through the slide bushing 168. Although the spring 172 provides a force to resist this movement, the spring 172 does permit the movement to occur. If the force is great enough, the movement can continue until the spring is fully compressed or the tension adjustment knob 170 comes into contact with the bridge coupling 137. The amount of movement that is permitted can be adjusted by using a longer or a shorter rod 132, and a correspondingly longer or shorter spring 172.

FIG. 5 is a perspective view of the example combine harvester 100, illustrating the header 104 and row unit divider assemblies 106 arranged in a folded configuration.

In some embodiments, the height and tension adjustment device 130 is disconnectable to permit the snout 114 to freely pivot about the snout pivot 116. For example, the first end 134 can be disconnected from the bonnet frame 122 by removing the pin 154 (as shown in FIGS. 3-4).

Once disconnected, the bonnets 112 are rotated upward, while the snouts 114 pivot downward under the force of gravity. The folded configuration of the row unit divider assemblies 106 requires less horizontal space for transportation and storage.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A row unit divider assembly for a combine harvester, the combine harvester for harvesting crops growing from a ground surface of a field, the row unit divider assembly comprising:
   a bonnet portion having a forward bonnet end and a rearward bonnet end opposite to the forward bonnet end;
   a snout portion having a forward snout end and a rearward snout end opposite to the forward snout end, the rearward snout end pivotally connected to the forward bonnet end of the bonnet portion; and a height and tension adjustment device coupled between the bonnet portion and the snout portion and arranged proximate to the forward bonnet end and to the rearward snout end, the height and tension adjustment device including:
  a height adjustment device operable to adjust an angle of the snout portion with respect to the bonnet portion; and
  a tension adjustment device including a spring to apply a tension to the snout portion, by which the snout portion is pressed toward the ground surface to resist upward movement of the snout portion away from the ground surface, the tension adjustment device operable to adjust the tension applied to the snout portion.

2. The row unit divider assembly of claim 1, wherein:
the snout portion includes a bridge to which the height and tension adjustment device is engaged;
the height and tension adjustment device includes a rod having a first end and a second end, the first end connected to the bonnet portion to allow the rod to pivot relative to the bonnet portion, and the second end secured to the bridge of the snout portion;
the height adjustment device is arranged at the second end of the rod and configured to adjust a distance between the first end of the rod and the bridge of the snout portion; and
the tension adjustment device is configured to provide an adjustable downward force on the snout portion to oppose upward movement of the snout portion away from the ground.

3. The row unit divider assembly of claim 2, wherein:
the height and tension adjustment device includes a pin; and
the rod defines an aperture at the first end, the aperture though which the pin is inserted to pivotally couple the first end of the rod to the bonnet portion.

4. The row unit divider assembly of claim 2, wherein:
the height adjustment device includes a height adjustment knob threadedly engaging the rod, the height adjustment knob configured to be rotated to adjust a position of the height adjustment knob relative to the rod.

5. The row unit divider assembly of claim 2, wherein:
the tension adjustment device is positioned between the first end of the rod and the height adjustment device and including a tension adjustment knob, the tension adjustment knob threadedly engaging the rod, the tension adjustment knob configured to be rotated to adjust the tension generated by the tension adjustment device.

6. The row unit divider assembly of claim 5, wherein:
the spring of the tension adjustment device surrounds at least a portion of the rod, the spring disposed between the tension adjustment knob and the bridge of the snout portion and generating a force applied to the tension adjustment knob and the bridge in opposite directions; and
the tension adjustment knob rotatable to adjust an amount that the spring is compressed between the tension adjustment knob and the bridge.

7. A combine harvester for harvesting crops growing from a ground surface of a field, the combine harvester comprising;
a combine machine; and
a header including a plurality of row unit divider assemblies for a combine harvester, each row unit divider assembly comprising:
  a bonnet portion having a forward bonnet end and a rearward bonnet end opposite to the forward bonnet end;
  a snout portion having a forward snout end and a rearward snout end opposite to the forward end, the rearward snout end pivotally connected to the forward bonnet end of the bonnet portion; and
  a height and tension adjustment device coupled between the bonnet portion and the snout portion and arranged proximate to the forward bonnet end and to the rearward snout end, the height and tension adjustment device including:
    a height adjustment device operable to adjust an angle of the snout portion with respect to the bonnet portion; and
    a tension adjustment device including a spring to apply a tension to the snout portion, by which the snout portion is pressed toward the ground surface to resist upward movement of the snout portion away from the ground surface, the tension adjustment device operable to adjust the tension applied to the snout portion.

8. The combine harvester of claim 7, wherein:
the snout portion includes a bridge to which the height and tension adjustment device is engaged;
the height and tension adjustment device includes a rod having a first end and a second end, the first end connected to the bonnet portion to allow the rod to pivot relative to the bonnet portion, and the second end secured to the bridge of the snout portion;
the height adjustment device is arranged at the second end of the rod and configured to adjust a distance between the first end of the rod and the bridge of the snout portion; and
the tension adjustment device is configured to provide an adjustable downward force on the snout portion to oppose upward movement of the snout portion away from the ground.

9. The combine harvester of claim 8, wherein:
the height and tension adjustment device includes a pin; and
the rod defines an aperture at the first end, the aperture though which the pin is inserted to pivotally couple the first end of the rod to the bonnet portion.

10. The combine harvester of claim 8, wherein:
the height adjustment device includes a height adjustment knob threadedly engaging the rod, the height adjustment knob configured to be rotated to adjust a position of the height adjustment knob relative to the rod.

11. The combine harvester of claim 8, wherein:
the tension adjustment device is positioned between the first end of the rod and the height adjustment device and including a tension adjustment knob, the tension adjustment knob threadedly engaging the rod, the tension adjustment knob configured to be rotated to adjust the tension generated by the tension adjustment device.

12. The combine harvester of claim 11, wherein:
the spring of the tension adjustment device surrounds at least a portion of the rod, the spring disposed between the tension adjustment knob and the bridge of the snout portion and generating a force applied to the tension adjustment knob and the bridge in opposite directions; and
the tension adjustment knob rotatable to adjust an amount that the spring is compressed between the tension adjustment knob and the bridge.

13. A height and tension adjustment device configured for installation between a bonnet portion of a row unit divider assembly and a snout portion of the row unit divider assembly, the height and tension adjustment device comprising:

a rod including a first end and a second end, wherein the first end is configured to be coupled to the bonnet portion of the row unit divider assembly;

a height adjustment knob positioned toward the second end of the rod and being adjustable along the length of the rod to adjust an angle of the snout portion with respect to the bonnet portion;

a tension adjustment knob positioned between the first end of the rod and the height adjustment knob, the tension adjustment knob adjustable along the length of the rod to adjust a tension applied to the snout portion; and a spring surrounding the rod and disposed between the height adjustment knob and the tension adjustment knob, the spring configured to apply the tension to the snout portion, by which the snout portion is pressed toward the ground surface to resist upward movement of the snout portion away from a ground surface.

14. A method of adjusting a snout of a row unit divider assembly for a combine harvester, the method comprising:

installing a height and tension adjustment device between a bonnet and snout of the row unit divider assembly, the bonnet and snout pivotally coupled at a snout pivot, and the height and tension adjustment device arranged proximate to the snout pivot;

adjusting a height of the snout with respect to the ground by adjusting a height adjustment knob of the height and tension adjustment assembly; and adjusting a downward force applied to the snout by adjusting a tension adjustment knob of the height and tension adjustment assembly, the height and tension adjustment assembly including a spring configured to generate the downward force, by which the snout is pressed down toward the ground to resist upward movement of the snout with respect to the bonnet after adjusting the height and downward force, while permitting upward movement if the upward movement has a sufficient force that exceeds the downward force.

* * * * *